United States Patent Office 3,259,484
Patented July 5, 1966

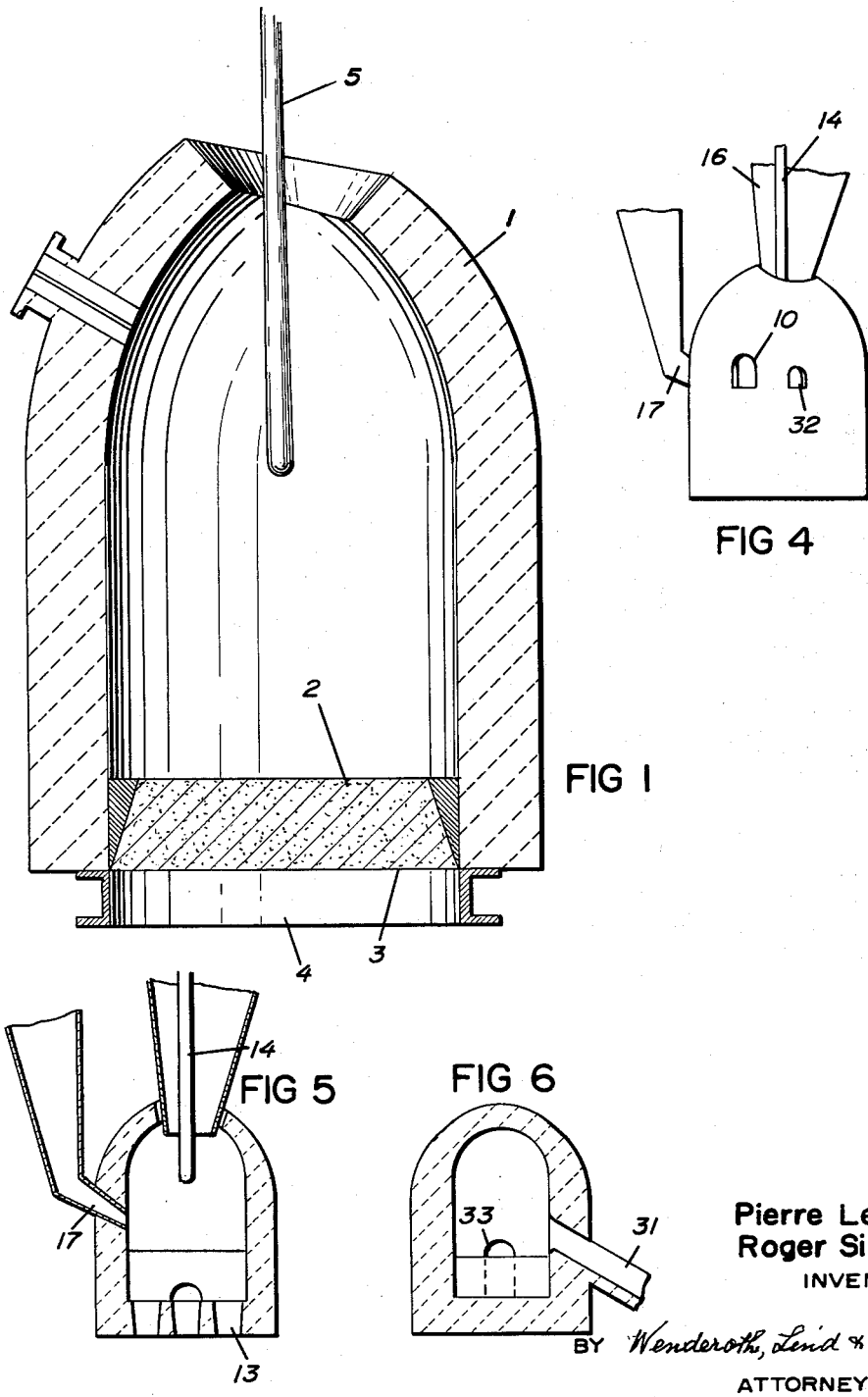

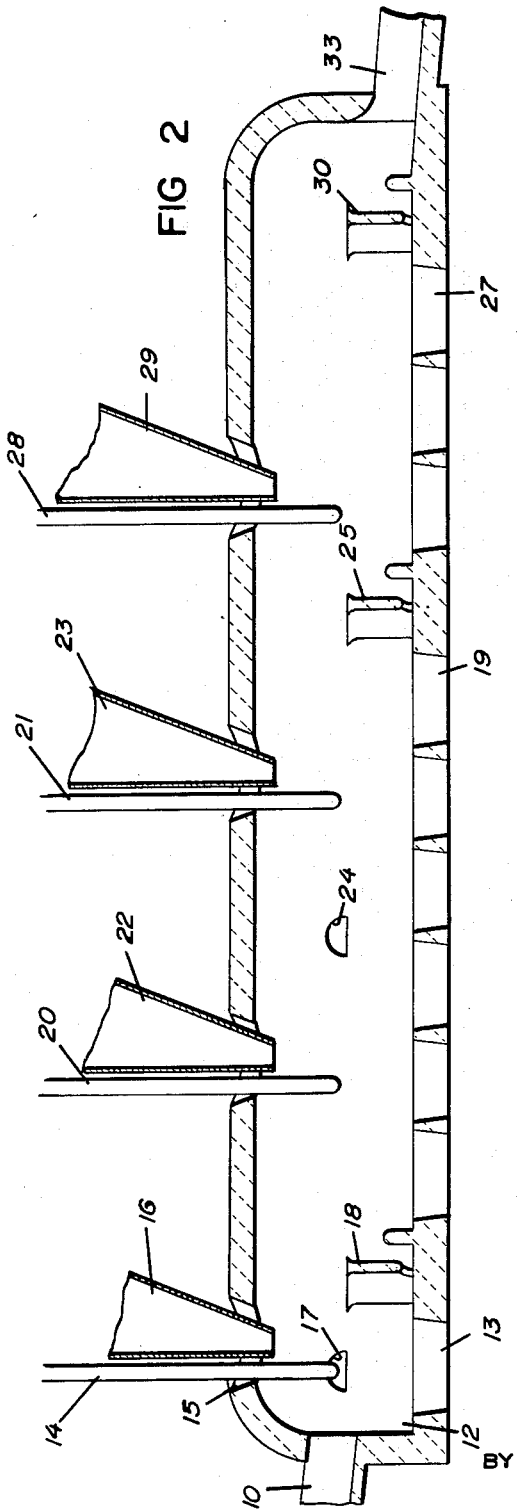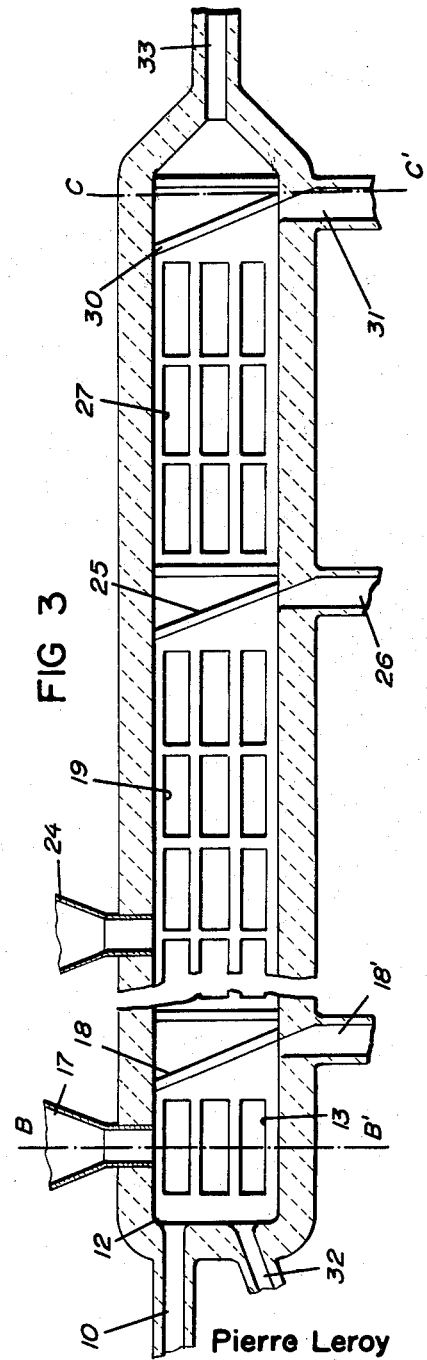

3,259,484
METHOD AND APPARATUS FOR PRODUCING STEEL FROM PIG IRON
Pierre Leroy, Saint-Germain-en-Laye, and Roger Simon, Boutheon, France, assignors to Compagnie des Ateliers et Forges de la Loire, Paris, France
Filed Apr. 11, 1963, Ser. No. 272,409
Claims priority, application France, Apr. 16, 1962, 894,579, Patent 1,344,238; Nov. 28, 1962, 916,861, Patent 82,642; Feb. 13, 1963, 924,642, Patent 83,116
5 Claims. (Cl. 75—52)

This invention is concerned with a novel method and apparatus for producing steel from pig iron.

For many years, the conversion of pig iron into steel was practically exclusively performed in basic Bessemer and in acid Bessemer converters, in which a blast of air, natural or somewhat enriched in oxygen, was blown upwardly into the charge of molten raw iron through the bottom of the converter, by means of a plurality of inlets formed through the refractory bottom of the converter. The blow gas has usually comprised air or air enriched with not more than 40% oxygen. Sometimes other oxidizing gas mixtures have been used, such as oxygen and steam, or oxygen and carbon dioxide, wherein the additional gaseous constituent, water vapor or carbon dioxide, breaks up with a strongly endothermic reaction.

The use of pure rather than highly dilute oxygen as the oxidizing gas would be very beneficial both in that it would greatly increase the thermal efficiency of the conversion process due to the absence of any diluting gas exerting a cooling effect, and in that it would avoid contaminating the steel product with atmospheric nitrogen. However, early attempts to use a pure oxygen blow in Bessemer converters failed because of the extremely high temperatures that are generated at the orifice of each blast inlet formed through the bottom of the converter, the consequent formation of iron oxides in large quantities in these over-heated areas, and the resulting rapid corrosion and burn-out of the refractory material.

These difficulties were later overcome in part through the development of converters and rotary furnaces provided with means for injecting the oxygen gas downwardly into the iron charge by means of nozzles projecting through the upper opening of the converter or furnace, the bottom of which was then provided solid. Steelmaking plant of this character has been an advance, in providing the aforementioned benefits attendant on a pure oxygen blow, but only did so at the cost of other complications, the following of which are especially conspicuous.

While the discharge of pure oxygen downwardly through the molten iron charge obviated the disastrous attack of the converter botom lining mentioned above, it still created very considerable local superheating in the iron melt, sufficient to generate abundant reddish fumes of iron oxide throughout the duration of the conversion process. The elimination of these noxious fumes required the provision of extensive dust-removing equipment which considerably increased over-all costs in plant construction and operation. Furthermore, the use of pure oxygen as the blow gas in a conversion process eliminated one of the controlling factors otherwise available over the conditions under which the conversion proceeds. That is, where the blow mixture comprises pure oxygen plus a diluting gas, the operating conditions can be controlled to a substantial extent by regulating the rate of delivery of the diluting gas to modify the turbulence produced in the molten bath independently of the rate at which the decarburizing reaction proceeds. With the use of pure oxygen, however, the degree of turbulence in the bath, which governs the conditions of conversion, can only be modified by regulating the rate of oxygen delivery, and hence modifying at the same time the rate of the decarburizing reaction. This seriously detracts from the flexibility and general utility of steel-making processes using pure oxygen blow as heretofore known to the art.

Objects of this invention include the provision of novel steelmaking processes and plant which will possess some or all of the following advantages:

Permit the use of a pure oxygen blow while minimizing or completely eliminating the generation of noxious red iron oxide fumes as well as other objectionable effects of local over-heating including refractory burn-out;

Permit the use of a pure oxygen blow, with a low proportion of other gas for maximum conversion rate and efficiency while retaining independent control over the turbulence occuring in the molten charge;

Provide a steel-making process that will be continuous in operation.

Other objects of the invention will appear from the disclosure.

In accordance with a main aspect of the invention, the oxygen required for the conversion process of the pig iron is blown upwardly through a porous refractory material.

In accordance with another aspect of the invention, the oxygen required for the conversion process of the pig iron is supplied in two separate fractions: a major fraction is blown upwardly into the molten charge through the bottom of a converter, which for this purpose is partly made from porous refractory material. This fraction may be supplied in the form of pure oxygen, or as an oxygen-rich mixture containing a diluting gas, the rate of which is adjustable to regulate the turbulence in the charge to an optimum value. The oxygen content in this fraction is preferably substantially higher than 60%. Further, a minor fraction of the requisite oxygen is delivered into the molten charge downwardly through one or more nozzles extending into the melt from the top of the converter. This fraction is supplied as pure oxygen gas, containing in suspension a high concentration of lime powder flux.

It has been found that the oxygen blown upwardly through a porous refractory bottom, ensuring a very fine state of division of the gas, greatly reduces local overheating at the interface between the bottom and the bath, and completely eliminates red fumes for a determined bath depth, at a given temperature.

It has also been found that the provision of the dual oxygen supply, upwardly and downwardly into the molten iron charge, when coupled with the other provisions specified, namely delivery of the upward blast through a porous refractory wall ensuring a very fine state of division of the blast, and suspension in the stream of downwardly blown pure oxygen of a high concentration of lime flux powder having an effective cooling action preventing local over-heating, completely eliminates local over-heating both in the refractory material of the converter and in the iron charge, preventing both refractory burn-out and formation of noxious oxide fumes, while retaining the benefits of a direct delivery of pure oxygen into the molten iron. At the same time, the turbulent condition in the charge can at all times be accurately controlled by regulating the rate of supply of a neutral gas together with the oxygen injected through the porous refractory bottom.

Exemplary embodiments of the invention will now be described for purposes of illustration but not of limitation with reference to the accompanying drawings, wherein:

FIG. 1 is a simplified view in vertical cross section of a batch converter for refining iron according to a first embodiment of the invention;

FIG. 2 is a simplified view in vertical longitudinal section of a continuous steel producing plant according to another embodiment of the invention;

FIG. 3 is a plan view corresponding to FIG. 2;

FIG. 4 is a corresponding end view;

FIG. 5 is a cross section on line B–B', FIG. 3; and

FIG. 6 is a cross section on line C–C', FIG. 3.

The steel-making process of the invention is susceptible of embodiment as a batch process, similar in this respect to conventional Bessemer conversion, or as a continuous process. FIG. 1 illustrates a batch converter according to a first embodiment, and more especially as applied to basic Bessemer refining process. As shown, the improved converter has a refractory shell 1 of the usual tapering shape, made e.g. of tar dolomite material, and a baseplate 2 made of a porous refractory substance such as porous spinel, supported on a perforate bedplate schematically indicated at 3. Under the bedplate 3 is shown a sealed windbox 4 connected by means not shown to a source or separate sources of an oxidizing gas or mixture as will be understood from what is to follow. Projecting downwardly into the converter through the upper opening of it, and supported by suitable means not shown, is a nozzle pipe 5 provided with water cooling means, not shown, and connected at its upper end to a source of pure oxygen as well as a source of powder limestone as presently explained.

A basic-Bessemer steel refining process using the converter shown in FIG. 1 can typically be conducted in the following manner, it being understood that the numerical values given are illustrative only. All gas volumes are referred to standard conditions of pressure and temperature.

Over the residual slag from a preceding refining operation, 8 metric tons of iron scrap followed by 50 metric tons of basic-Bessemer pig iron are charged. Gases are then blown into the converter in the following conditions:

An upward blast of oxygen is blown through the refractory base-plate 2 at a rate of 100 m.$^3$/min., for a period of 18 minutes. This blast is combined, over a six-minute period from the 4th through the 9th minute, with a delivery of an argon mixture (argon containing some oxygen but substantially free from other gases) at a rate of 15 m.$^3$/min. During the same 18 minute period, pure oxygen is blown downwardly through the pipe 5 at a rate of 15 m.$^3$/min., containing in suspension lime powder supplied at a rate which is initially about 100 kg./min. and is later increased to about 250 kg./min. At the end of this 18 min. period which constitutes the first stage of the converting process, the delivery of gases is cut off, the converter is tilted and the phosphate-containing slag is cleaned out. The converter is restored to its erect position, and the second stage of the process is initiated. For the production of extra-mild steels, this second stage may last about 8 minutes, and involves the following addition of materials.

An upward blast of oxygen is delivered through the porous base-plate at the rate of 95 m.$^3$/min., without any diluting argon admixture. Oxygen is injected downwardly through pipe 5 at the rate of 15 m.$^3$/min., together with powder limestone at the rate of 200 kg./min. Throughout this 8-minute period, moreover, crushed calibrated iron oxide ore is added into the converter, to a total amount of 1750 kg. The gas delivery is then cut off, the converter tilted and the steel product is discharged in the usual manner.

As illustrated in this example, the oxidizing gas blown upwards through the bottom of the converter actually is pure oxygen during a substantial period of the conversion cycle. A similar measure would be completely impractical in a conventional converter, as pointed out earlier.

It will be noted that in the exemplary converter described, wherein the porous bottom 2 was 3 meters in effective diameter, the maximum rate of gas flow to be provided for as indicated by the above figures is less than 2 liters per minute per square centimeter. This flow-rate is consistent with the range of permeabilities readily achievable in porous refractory materials, and may require a blast pressure of about 1.5 kg. per cm.$^2$ in the windbox 4, said pressure being adjusted as required depending on the particular permeability value of the refractory bottom 2 used.

Various gases, other than the argon mixture mentioned, may be used as the diluent gas constituent blown with the oxygen through the porous bottom of the converter. While the chief function of this gas is to provide a means of conveniently adjusting the precise degree of turbulence present in the molten iron at each instant during the conversion process, it can simultaneously perform further useful functions. Thus, the diluent gas is not necessarily inert as is argon, but may combine with the steel product to impart a desired characteristic to it. Thus, nitrogen may be used as the diluent gas if a nitrogen content is desired in the final steel. Partially oxidizing gases, including especially water vapor and carbon dioxide, may also be used as the diluent gases separately or together. The use of such gas constituents, having an endothermic oxidizing reaction, may be advantageous in that the resulting heat absorption exerts a cooling effect on the refractory lining of the converter. This feature, however, occurs of course at the cost of a reduction in the favorable thermal balance of the conversion process, and to counteract this tendency an additional quantity of oxygen may be supplied into the converter to burn up the hydrogen, carbon and/or carbon monoxide resulting from the breakdown of the water vapor and/or carbon dioxide within the molten bath itself. The additional oxygen just mentioned may be supplied as pure oxygen or as an oxidizing mixture, and may desirably contain fine suspended solid particles to enhance the heat exchange between the molten iron and the flame produced by the combustion of the hydrogen or carbon or carbon monoxide.

The oxidizing gas mixture blown up through the porous refractory base of the converter may, in alternative embodiments of the invention, comprise ordinary or oxygen-enriched air.

The pure oxygen blast injected downwardly into the molten charge by way of nozzle 5, should contain lime or limestone powder in a relatively very high concentration, greater than about 2 kg./m.$^3$, representing the whole, or the major part, of the lime flux required in the refining process.

Instead of providing a bottom 2 which is porous substantially throughout its extent as shown, the converter bottom may be porous in sections only. The downward injection pipe or nozzle 5 is not necessarily vertical, but may extend at an angle to the vertical, provided its general direction is downward. More than one such nozzle may be provided if desired.

As earlier mentioned, a very important advantage of the invention resides in the feasibility of embodying it as a continuous steel refining process, as will now be described with referenec to FIGS. 2–6.

The continuous refining plant there shown comprises a generally cylindrical, horizontally elongated refractory shell structure somewhat similar in cross sectional shape to the shape of the batch converter first described, as indicated by comparing FIGS. 5 and 1. Connecting with the inlet end wall of the structure is a channel 10 for the continuous delivery of a stream of molten pig iron to be refined. The head or inlet section 12 of the continuous converter can be considered as a desiliconizing zone or section, and its flat base or hearth is fitted with porous refractory sectional slabs 13 (herein three in number) through which an oxidizing gas, preferably pure oxygen intermittently mixed with a separately adjustable flow of diluent gas, is adapted to be discharged upward into the molten iron as described with reference to the batch converter of FIG. 1. The upper arch of the continuous converter is formed with spaced apertures such as the aperture 15 overlying the initial or head section 12, and projecting down through this aperture to a point about midway of the height dimension of the converter is an injector nozzle 14 for the blowing of pure oxygen containing a heavy suspension of lime powder flux as earlier described. A feeder 16 is also shown as extending partly into the aperture 15 for the supply of various additions such as iron oxide materials including ore, pellets, conglomerates and the like, basic and fluxing additions such as lime, limestones spar, etc. A side opening 17 formed in the sidewall of the shell and connected with the outlet of another feeder (see FIG. 5) serves to add iron scrap. A side outlet 18', formed in the opposite shell sidewall somewhat beyond aperture 17 serves for the continuous discharge of siliceous slag, by way of a syphon 18 extending obliquely across the converter structure. This deslagging syphon and outlet is useful in the case of exceptionally high silicon contents in the iron being refined, but is not required for raw irons of moderate silicon concentrations.

Beyond the slag outlet 18' the converter can be considered as defining a main refining or de-carburizing zone or section, which is substantially longer than the initial, or desiliconizing zone. This main section has a flat bottom or hearth in which a plurality of (herein eighteen) porous refractory slabs such as 19 are inset for the same purpose as previously described. In the top of this main section are two longitudinally spaced openings through each of which downwardly projects a pure-oxygen-injecting nozzle 20, 21 respectively, and an addition-supplying feeder 22, 23 respectively. A single side door 24 for the supply of iron scrap is shown in the side-wall of this decarburizing or main section about midway of its length. At the output end of this section is provided a syphon 25 and phosphate slag outlet channel 26 for use in the case of high-phosphorous irons.

The main or decarburizing section is followed by a shorter final refining section, having a base provided with (herein nine) porous refractory sections 27 and a single top aperture for insertion of an oxygen-injecting nozzle 28 and addition feeder 29. Towards the end of this final section there is provided a de-slagging syphon 30 and outlet channel 31 for discharging the final slag preferably into a heat-isolated slag container, not shown. The slag container, when filled with hot molten slag, may be taken up by suitable conveyor means and transported to the inlet end of the converter structure, and the molten slag dumped back into the initial section by way of an inlet 32 provided in the inlet end wall of the shell.

An outlet 33 formed in the far end wall of the converter shell serves for the continuous discharge of a stream of refined steel.

The top openings provided in the vault of the converter shell are preferably provided with hoods, not shown, for the collection and discharge of gases and fumes.

A typical steel refining process as performed by means of the continuous converter described may be carried out in the following manner, it being understood that all numerical data given are mainly illustrative. Gas volumes are again referred to standard conditions.

Pig iron is delivered through iron inlet 10 at a rate of 5 metric tons per minute. Oxidizing gas is blown up through each of the porous refractory rectangular slabs of the three sets 13, 19 and 27, at the rate of 8 m.$^3$/min. per slab. In the case of the foremost six porous slabs 19 in the main refining section, this oxidizing gas was a mixture of 7 m.$^3$/min. oxygen and 1 m.$^3$/min. argon mixture per slab. In all of the remaining slabs the oxidizing gas was pure oxygen. Through each of the injector nozzles 14, 20, 21 and 28, 15 m.$^3$/min. pure oxygen was delivered containing powder lime at the rate of 150 kg./min. per nozzle. Scrap iron was supplied through both inlets 17 and 24 at a combined average rate of 800 kg./min. Ore was supplied at the rate of 50 kg./min. through each of the four feeders 16, 22, 23 and 29. However, in the case of pig iron stock having a silicon content above 0.8%, the 50 kg. batch of ore supplied through the first inlet 16 per minute is replaced by an equal weight of rolling-mill scale, which requires a shorter reaction time than does ore, and thus ensures complete reaction ahead of the de-slagging hyphon 18 and silicate-discharge outlet 18', which are operated with the high-silicon pig iron, but are not used where the inlet pig iron stock contains less than 0.8% Si.

Thermo-couple probes were provided to indicate continuously the temperatures at three points, to wit: within the molten iron in the inlet 10 just ahead of its entry into the continuous converter; at the point of discharge of the phosphate slag, adjacent to syphon 25; and in the steel outlet channel 33 just beyond the outlet from the continuous converter. The rate of supply of the various additions described above were adjusted so as to maintain the temperatures in the metal adjacent syphon 25 and at the steel outlet 33 substantially constant at prescribed values, despite fluctuations in the chemical composition and temperature of the pig iron delivered through inlet 10. It will be understood in this connection that the rates of addition indicated above are typical for pig iron of a conventional basic-Bessemer (so-called Thomas) grade but would be subject to considerable variations in practice both from one run to another and during a given run, in dependency on inevitable variations in instantaneous conditions.

It is especially noteworthy that in this example the majority of porous slabs 13, 19, 27, are continuously delivering pure oxygen throughout the run, in spite of which no refractory burn-out or other objectionable consequences of superheating, as would unfailingly occur were it attempted to blow oxygen through separate passages formed in an otherwise solid converter base, are here observed.

A continuous converter of the type described can be operated continuously over long periods. As in any steel-producing plant however, its refractory lining will require periodic repair. To provide for this a duplicate continuous converter is preferably provided for intermittent operation and shut-down in alternation with the first converter.

While the continuous converter installation illustrated in FIGS. 2-6 and described above represents a satisfactory practical embodiment, various modifications are conceivable within the scope of the invention. For example, instead of providing separate top openings spaced longitudinally of the converter vault, as shown, the vault may be formed with a continuous longitudinal slot-like opening over which there would be provided a continuous elongated hood with gas discharge conduits leading from it. The oxygen injection nozzles such as 14, 20, 21, 28, and addition feeders such as 16, 22, 23, 29, would be inserted at suitable points through such slot. As indicated in connection with the batch converter embodiment of FIG. 1, complementary oxygen may be injected to increase the thermal efficiency of the process, and for the purpose of such injection secondary oxygen nozzles may be provided, which would preferably discharge at points somewhat above the outlets of the primary oxygen injectors such as 14, 20, 21, 28.

According to a modified embodiment, one, some, or all of the sections of the continuous converter may be constructed and supported for limited rocking movement about a horizontal transverse axis, for facilitating the discharge of molten metal on termination of a refining run. In such case the bottom of the section considered may be provided with a slope in a direction reverse from the direction of flow of the metal through the converter.

It will be understood from earlier explanations that the main advantages of the process and plant of the invention lie in the prevention of local over-heating both in the converter lining and in the molten bath, and the consequent absence of reddish oxide fumes and other ill-effects of overheating, and in the possibility that is provided of regulating the rate of delivery of neutral gas to adjust the degree of turbulence in the iron melt to the precise degree required for a suitable metallic output and a short refining time.

The former of these results, i.e. absence of overheating and fume formation, is primarily due to the highly divided state of the oxygen blown through the porous refractory bottom into the molten charge, preventing over-heating at the points of impact, and also due to the fact that since the major amount of oxygen is delivered upwards into the bottom of the charge, in contrast with some of the conventional processes earlier referred to herein, any iron oxides forming in the deeper areas of the bath are promptly reduced by the reducing constituents in the charge, while the heat thus generated is dissipated throughout the whole mass of the metal charge without tending to produce local overheating at the surface of the bath and consequent formation of the fumes present in the afore-mentioned earlier processes involving exclusively downward oxygen delivery. The uniformly divided state of the oxidizing gas injected upwards into the bottom of the charge according to the invention, and the resulting uniform distribution of heat, also provide the reason for the relatively long service life of the refractory materials of a converter constructed and operated according to the invention, in contrast to the prompt burn-out of the converter bottom in prior processes that have attempted to deliver oxygen-rich gas mixtures through inlets formed in an otherwise solid converter bottom. It is to be noted in this connection that whereas in such prior installations it was found quite impractical to deliver through the converter base inlets an oxidizing mixture containing more than about 40% oxygen, under penalty of rapidly putting the converter refractory lining out of commission, the use of the porous injection means according to the invention makes it entirely feasible to inject upwardly into the bottom of the charge an oxidizing gas which may consist of pure oxygen, throughout part or all of the conversion process, as plainly illustrated by the numerical data in the practical examples described above. The proportion of diluent gas in the upwardly injected mixture may be just as low as required to provide the desired degree of turbulence, as well as any other auxiliary effects as described herein. This can be explained by the consideration that for a given instantaneous rate of oxygen delivery, the heat generated when injecting pure oxygen (as in the invention) through the minute pores of a porous refractory block, is distributed over the entire area of injection, and is thence transferred to the whole mass of molten metal. In contrast, with the conventional solid bottom wall formed with separate inlets, even if provided in the relatively large number of say 200 or 300, the same amount of heat would be concentrated in each of these limited injection areas and would therefore generate a sharp increase in temperature at the corresponding points of the bottom of the molten charge, causing rapid destruction of the refractory material around the outlets of the discharge orifices immediately below such hot points.

As concerns the jet of pure oxygen injected downwardly into the molten charge, it is found according to the invention that any possible local overheating thereby at the point of impact of the jet on the molten metal surface is effectively prevented owing to the presence therein of a high concentration of lime or limestone flux powder, which exerts a cooling action capable of completely compensating the heat generated by the oxidation reaction.

Referring to the feature of controlled turbulence provided by the invention through regulation of the rate of delivery of neutral (or partly oxidizing) diluent gas blown upwardly through the porous converter bottom together with oxygen, this feature as earlier indicated renders the degree of turbulence in the molten metal independent of the rate of decarburization. Generally speaking, turbulence in the molten charge due to whatever cause promotes an equalization of concentrations therein. However, the naturally occurring turbulence present in an iron melt during refining due to the evolution of carbon oxide gas is frequently inadequate to ensure fully uniform concentrations, for example during the initial stages of conversion of an iron melt with a downwardly injected stream of pure oxygen. Any lag in decarburization due to blow conditions tending to increase excessively the rate of dephosphorization in the melt (e.g. high elevation of the oxygen nozzle, high reactivity of the lime flux used, high fluidity of the slag formed), will thus tend to create an unbalance between the carbon concentration in the melt and the iron oxide concentration in the slag, and such unbalance will in turn a few seconds later result in violent reactions and throwing up of metal and slag, with corresponding losses. According to the invention, on the other hand, the degree of turbulence in the bath can at all times be accurately controlled, by suitable regulation of the rate of delivery of diluent gas in the oxidizing mixture blown upwards through the porous refractory converter bottom, so as to ensure consistently uniform chemical concentrations throughout the melt and prevent the occurrence of the unbalance effects referred to. The controlled delivery of diluent gas at the same time enables a full control to be exerted over other factors involved in the conversion process.

In cases where it is desired to avoid contamination of the final steel product with nitrogen, the diluent gas used should be some neutral or inert gas such as argon, conveniently in the form of an argon mixture containing a miner amount of oxygen (e.g. 1 or 2% or more) and no more than traces of other gases, as made inexpensively available in oxygen producer works. Should it be desired on the other hand to include nitrogen at a predetermined concentration as a constituent in the refined steel, the said diluent gas may consist of or include nitrogen (or air) in a predetermined proportion. In yet other cases, the oxidizing gas mixture blown up through the porous converter bottom may simply comprise air, natural or oxygen-enriched, although this will usually be found less advantageous.

Among the advantages of the invention is that it makes possible to increase greatly the rate of the conversion process through increasing the rate of oxygen delivery into the melt, without any substantial foaming of the slag and without throwing up slag and metal out of the molten bath. These advantages are mainly due to the fact that the major proportion of refining oxygen is delivered into the bath through the porous converter bottom, and hence with a high rate of flow but at relatively low velocity, and correspondingly low momentum. It may further be noted that the lime or limestone flux is introduced according to the invention in a highly divided, and hence reagent, form.

The control factors made available to the operator in a process according to the invention for controlling conversion conditions, including especially prevention of slag foaming and avoidance of marked unbalance in composition as between metal and slag, include the following:

The rate of delivery of lime flux with respect to the total rate of oxygen input can be increased or reduced at will without having to modify at the same time the lime concentration in the downwardly blown stream of pure oxygen; it is simply necessary to modify the total rate of delivery of said oxygen-and-lime stream with respect to the rate of the upwardly blown oxygen.

The degree of agitation or turbulence in the molten metal can be increased and reduced at will by action on the rate of diluent gas accompanying the oxygen discharged through the porous bottom.

The conversion rate can be increased and reduced as desired through simultaneous and correlated action on the rates of gas delivery in either or both the upward and downward oxidizing blasts.

An additional and outstanding advantage of the invention is the feasibility of its being embodied in a fully continuous steel-making process wherein an unbroken flowing stream of molten pig iron is continuously converted to steel.

It will be understood that various changes and modifications may be introduced into the specific exemplary embodiments of the invention shown and described without exceeding the scope of the invention. While particular reference has been made to a basic refining process, the invention is clearly applicable to acid refining processes, depending on the composition of the raw iron to be converted.

The embodiments of the invention relative to which this exclusive right of property is claimed are defined as follows:

1. The method of producing steel from liquid pig iron, with a very low production of reddish fumes, and with an independent control over the turbulence occurring in the molten charge, comprising the steps of confining a mass of molten raw iron in a container having porous wall means at least partly defining the bottom of said container, blowing gas containing a major portion of the oxygen required to refine said iron upwardly into the molten mass through the pores in said bottom and blowing the remaining proportion of said oxygen together with a high concentration of lime flux suspended therein downwardly into said molten mass from above the surface thereof.

2. The method of claim 1, wherein said lime flux is present in said oxygen at a concentration not less than about 2 kilograms per cubic meter referred to standard conditions.

3. The method of claim 1, wherein said lime flux present in said oxygen comprises limestone.

4. A continuous steelmaking process, comprising running a continuous stream of molten raw iron through an elongated, refractory-bounded channel having porous bottom wall means, blowing oxidizing gas up through the pores in said bottom wall means, blowing a small proportion of oxygen together with a high concentration of lime flux suspended therein downwardly into said molten metal from above the surface thereof, and continuously collecting steel at an outlet end of said channel.

5. The process of claim 4, wherein said lime flux is present in said oxygen at a concentration not less than about 2 kilograms per cubic meter referred to standard conditions.

References Cited by the Examiner

UNITED STATES PATENTS

| | | | |
|---|---|---|---|
| 2,708,572 | 5/1955 | Hudson et al. | 266—35 |
| 2,793,110 | 5/1957 | Kosmider et al. | 75—60 |
| 2,803,535 | 8/1957 | Kosmider et al. | 75—60 |
| 2,804,385 | 8/1957 | Graef | 75—60 |
| 2,820,706 | 1/1958 | Larsen | 75—52 |
| 2,871,008 | 1/1959 | Spire | 266—39 |
| 2,950,186 | 8/1960 | Allard | 75—52 |
| 2,975,047 | 3/1961 | Leroy et al. | 75—59 |
| 3,003,865 | 10/1961 | Bridges | 75—60 |
| 3,004,847 | 10/1961 | Lambert et al. | 75—60 |

FOREIGN PATENTS

| | | |
|---|---|---|
| 790,177 | 2/1958 | Great Britain. |
| 868,619 | 5/1961 | Great Britain. |

BENJAMIN HENKIN, *Primary Examiner.*